US011674602B2

(12) United States Patent
Jimenez

(10) Patent No.: US 11,674,602 B2
(45) Date of Patent: Jun. 13, 2023

(54) AUTOMATED LINE BLIND

(71) Applicant: DeltaValve, LLC, South Jordan, UT (US)

(72) Inventor: Filiberto Jimenez, South Jordan, UT (US)

( * ) Notice: Subject to any disclaimer, the term of this patent is extended or adjusted under 35 U.S.C. 154(b) by 62 days.

(21) Appl. No.: 17/165,391

(22) Filed: Feb. 2, 2021

(65) Prior Publication Data

US 2021/0239221 A1 Aug. 5, 2021

Related U.S. Application Data

(60) Provisional application No. 62/969,577, filed on Feb. 3, 2020.

(51) Int. Cl.
*F16K 3/02* (2006.01)
*F16K 3/20* (2006.01)
*F16K 3/312* (2006.01)

(52) U.S. Cl.
CPC .............. *F16K 3/0281* (2013.01); *F16K 3/20* (2013.01); *F16K 3/207* (2013.01); *F16K 3/312* (2013.01)

(58) Field of Classification Search
CPC .......... F16K 3/0281; F16K 3/20; F16K 3/207; F16K 3/312; F16K 41/003
See application file for complete search history.

(56) References Cited

U.S. PATENT DOCUMENTS

| | | | | |
|---|---|---|---|---|
| 3,110,470 A * | 11/1963 | Dumm | .................... | F16K 3/207 251/167 |
| 4,377,274 A * | 3/1983 | Mayhew, Jr. | ......... | F16K 3/0281 251/266 |
| 4,909,272 A * | 3/1990 | Carpentier | ............ | F16K 3/0281 137/315.31 |
| 5,577,707 A * | 11/1996 | Brida | ........................ | F16K 3/20 251/193 |
| 5,607,165 A * | 3/1997 | Bredemeyer | ......... | F16K 41/003 277/910 |
| 5,927,684 A * | 7/1999 | Marx | ........................ | F16K 3/20 277/618 |
| 6,250,604 B1 * | 6/2001 | Robert | ...................... | F16K 3/12 277/550 |
| 8,408,519 B2 * | 4/2013 | Ohlson | ................. | F16K 3/0227 251/355 |
| 8,936,701 B2 * | 1/2015 | Lah | ....................... | F16K 3/0281 202/241 |
| 10,012,316 B2 * | 7/2018 | Taguchi | ................ | F16K 3/0218 |
| 10,274,091 B2 * | 4/2019 | Schlutter | ................. | F16K 3/207 |
| 11,384,844 B2 * | 7/2022 | Karlsen | ................... | F16K 5/205 |

(Continued)

FOREIGN PATENT DOCUMENTS

DE 2746609 A1 * 4/1979
JP S59137463 U * 9/1984

(Continued)

*Primary Examiner* — David Colon-Morales
(74) *Attorney, Agent, or Firm* — Michael F. Krieger; Kirton McConkie

(57) ABSTRACT

A low-weight, low material automated line blind valve with an actuator for moving the blind between an open and closed position, a sealing mechanism that can create a tight seal with the blind in either the open or closed position, and a biasing mechanism to improve the seal, wherein the biasing mechanism includes a ring with a sealing lip capable of creating a tight seal with a mating surface.

10 Claims, 5 Drawing Sheets

(56) References Cited

U.S. PATENT DOCUMENTS

2009/0095932 A1* 4/2009 Leblanc ................. F16L 57/06
251/326
2009/0236554 A1* 9/2009 Gifford ................ F16K 3/0281
251/328

FOREIGN PATENT DOCUMENTS

| WO | WO-9825057 A2 * | 6/1998 | ............. F16K 3/207 |
| WO | WO-2008023499 A1 * | 2/2008 | ............... F16K 3/20 |
| WO | WO-2017158077 A1 * | 9/2017 | ............. E21B 29/04 |

* cited by examiner

AUTOMATED LINE BLIND

CROSS-REFERENCED APPLICATIONS

This application claims priority to provisional patent application No. 62/969,577 which was filed Feb. 3, 2020.

TECHNICAL FIELD

The present disclosure relates generally to an automated line blind. More particularly, the disclosure relates to a valve for sealing the flow of process.

BACKGROUND

Isolation valves are used to isolate sections of the refinery, such as the Fluidized Catalyst Cracking Unit that can operate at temperatures of 1400 F. The size of the isolation valve varies according to the diameter of the pipe delivering the liquid from which an operation must be isolated and can be as large as 12 feet in diameter. As they are not used often, they are usually cumbersome to manually operate and are constructed of relatively inexpensive materials. If a butterfly isolation valve does not seal tight enough, an operation may require a second valve to completely block off the line to create a positive tight shut-off. The second valve may be a blind valve and may be as large as 40 feet in length. Some primitive isolation valves require chain falls and hoists to install a plate by bolting it into place over the open line. These solutions, while less expensive and requiring less space pose significant health hazards by exposing workers to the hot fluid process as well as the risks posed by manually operating equipment to place heavy block-off plates into the line.

BRIEF SUMMARY

The general purpose of the systems and methods disclosed herein is to provide an improved isolation valve. Specifically, positive shut off is important for both worker safety and for proper servicing of downstream equipment. The automated line blind valve provides the required seal necessary to isolate the downstream while requiring minimal materials and space to operate and manufacture. The overall apparatus contains a valve body with a blind which slides through the valve body to seal the valve. This apparatus is designed to work in conjunction with a variety of existing refinery environments, but it could also be included in conjunction with any environment which requires an isolation valve.

In one non-limiting embodiment, the automated line blind apparatus 105 comprises a valve body 110. In some embodiments the valve body 110 comprises an annular recess 115 on the inside wall 120 wherein a portion of the annular recess comprises a receiving channel 125 formed through the valve sidewall, and a portion of the annular recess comprises a receiving groove 130. In some embodiments the line blind comprises a sealing mechanism 135 comprising a ring 140 on a first side 145 of the annular recess 115 wherein the ring 140 is configured to slide bi-directionally along long axis 150 of the valve, and a mating surface 155 on a second side 160 of the annular recess 115 opposite the ring 140. In some embodiments the line blind comprises a bias mechanism 165 adjacent the annular recess 115 wherein the bias mechanism 165 is configured to selectively actuate the ring 140 along the long axis 150 of the of the valve 105. In some embodiments the line blind comprises a blind 170 configured to selectively actuate bi-directionally transverse the long axis of the valve, through the receiving channel 125 wherein in a closed position the blind is configured to selectively nest in the annular recess and form a seal with the sealing surface when the bias mechanism is activated. In some embodiments the leading edge of the blind 170 comprises an angled knife edge or chiseled edge configured to clean the sealing surface 175.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Accordingly, there exists a need to for a line blind valve which can isolate a downstream portion from an upstream portion.

The features and advantages of the present disclosure will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1-8 are not intended to limit the scope of the invention, as claimed, but are merely representative of present embodiments of the invention.

In general, the figures disclose an invention that provides a line isolation valve.

In the following description, numerous references will be made to line valves and downstream flow, but these items are not shown in detail in the figures. However, it should be understood that one of ordinary skill in the art and in possession of this disclosure, would readily understand how the present disclosure and existing refinery structures can be incorporated.

Figure 1:
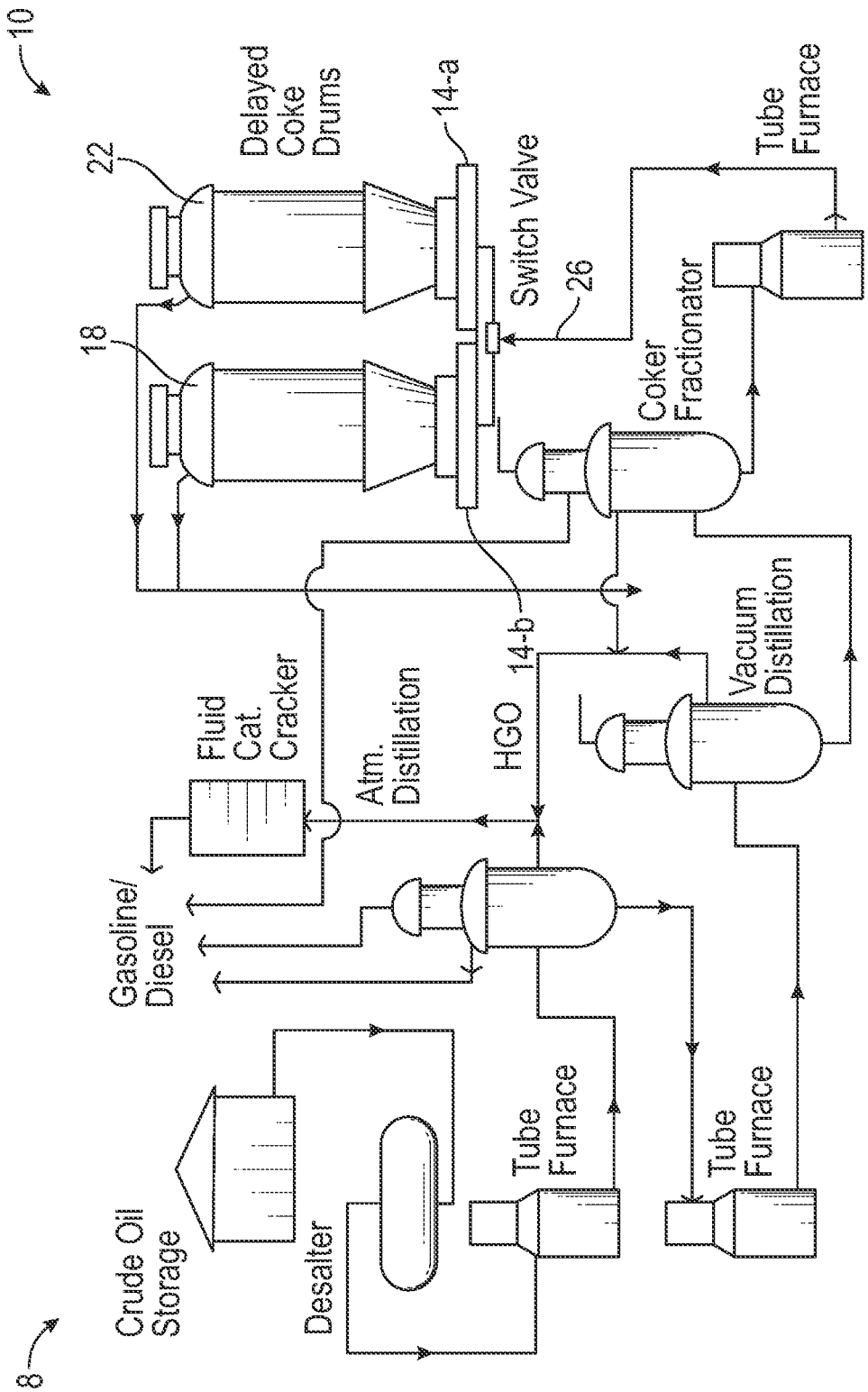
FIG. 1 illustrates an exemplary portion of a refining process.
Figure 2:
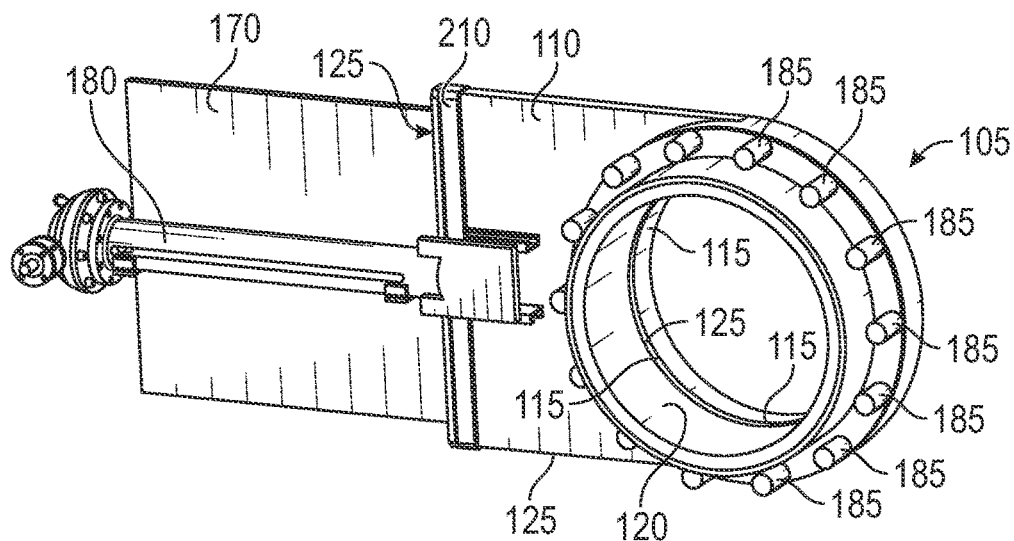
FIG. 2 illustrates a perspective view of an automated line blind.
Figure 3:
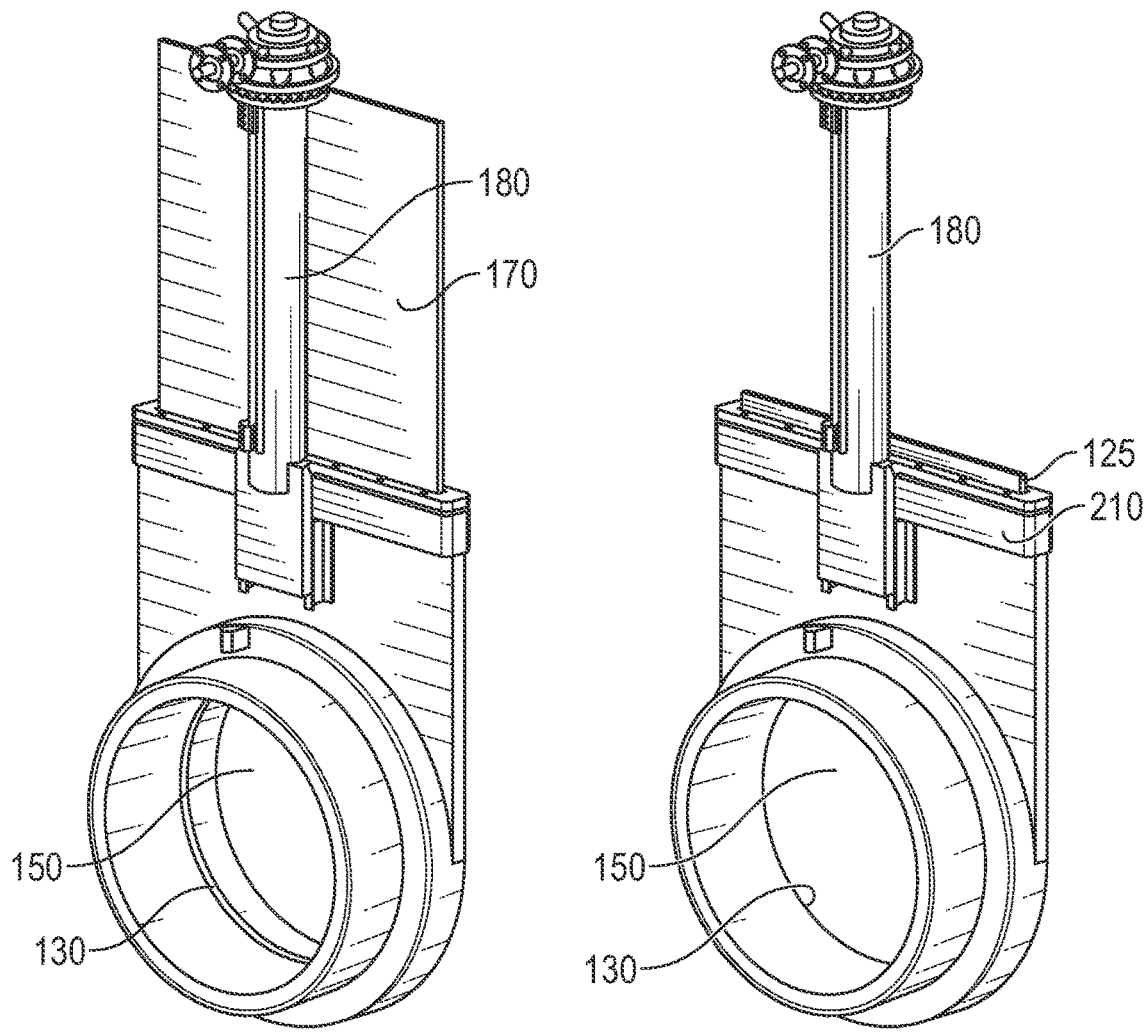
FIG. 3 illustrates a perspective view of the automated line blind in a first opened position and a second closed position.

FIG. 1 depicts, generally, a petroleum manufacturing and refinery process 8 having several elements and systems present (identified, but not discussed). In addition to these elements, petroleum manufacturing and refinery process 8 may include a first and a second coke drum 18 and 22, respectively, and de-header valves 14-a and 14-b attached thereto. In typical delayed coking operations, there are at least two coke drums in simultaneous operation so as to permit the ongoing, batch continuous, manufacture and refinery of petroleum as well as its coke byproduct.

Detailed references will now be made to the preferred embodiments of the disclosed invention, examples of which are illustrated in FIGS. 2-7 illustrate various views of an automated line blind 105 in accordance with one or more embodiments of the invention. In one non-limiting embodiment, the automated line blind apparatus 105 comprises a valve body 10. In some embodiments the valve body 110 comprises an annular recess 115 on the inside wall 120 wherein a portion of the annular recess comprises a receiving channel 125 formed through the valve sidewall, and a portion of the annular recess comprises a receiving groove 30. In some embodiments the line blind comprises a sealing mechanism 135 comprising a ring 140 on a first side 145 of the annular recess 115 wherein the ring 140 is configured to slide bi-directionally along long axis 150 of the valve, and a mating surface 155 on a second side 160 of the annular recess 115 opposite the ring 40. In some embodiments the line blind comprises a bias mechanism 165 adjacent the annular recess 115 wherein the bias mechanism 165 is configured to selectively actuate the ring 140 along the long axis 150 of the of the valve 105. In some embodiments the line blind 105 comprises a blind 170 configured to selectively actuate bi-directionally transverse the long axis of the valve, through the receiving channel 125 wherein in a closed position the blind is configured to selectively nest in the annular recess and form a seal with the sealing surface when the bias mechanism is activated.

In some embodiments the automated line blind comprises an actuator 180 coupled to the exterior of the valve 110 and configured to selectively actuate the blind into and out of the receiving channel 25. In some embodiments the actuator 180 is a rising stem actuator. In some embodiments a non-rising stem actuator is utilized, to conserve space. In some embodiments a telescoping actuator actuates the blind 170. One advantage of the present invention is the simplicity of the blind. In some embodiments a bonnet or other support structure is unnecessary to support the blind when the valve 105 is in the open position. This reduces the costs for both the manufacturing time, manufacturing materials, as well as the operating space required to accommodate the present invention. The receiving channel provides the support necessary to maintain the blind 170 in the correct orientation as it actuates from a closed position to an open position and from an open position to a closed position. In some embodiments support tracks are utilized to orient the blind. In some embodiments alternative actuators are used such as a rack and pinion or a lift suspended from a different structure.

In some embodiments the line blind 105 comprises a biasing mechanism 165. In some embodiments the biasing mechanism comprises a plurality of pistons 185 annularly spaced distally so as to align with the distal portion of the ring. In some embodiments the pistons 185 are spaced at ten inch intervals. In some embodiments the piston is coupled to the ring 140. In some embodiments the piston 185 is cantilevered to the ring. In some embodiments the piston 185 can be selectively activated to bias the ring along the longitudinal axis 150 of the valve to engage the ring against the blind 170 when the valve 105 is in the open position. In some embodiments the pistons 185 are selectively activated to engage the ring 140 against the mating surface 155 disposed on the second side 160 of the annular recess 115. The surface of the ring and the mating surface 155 form the sealing surface 75 that seals the valve body 110 and prevents fluid process from escaping into the first side of the ring 200 or the second side of the ring 110 or from escaping into the environment. In some embodiments the mating surface 155 is beveled to receive the ring and improve the seal between the ring 140 and the mating surface 155. In some embodiments the ring comprises a plurality of seals 125 configured to further prevent fluid process from leaving the central channel of the valve.

In some embodiments the biasing mechanism comprises a spring configured to bias the ring toward the annular recess. In some embodiments the biasing mechanism comprises a plurality of springs 190 annularly spaced distally so as to align with the distal portion of the ring. In some embodiments the spring is coupled to the ring 140. In some embodiments the spring 190 is cantilevered to the ring. In some embodiments the spring 190 can be selectively activated to bias the ring along the long axis 150 of the valve to engage the ring against the blind 170 when the valve 105 is in the open position. In some embodiments the springs 190 are selectively activated to engage the ring 140 against the mating surface 155 disposed on the second side 60 of the annular recess 115. The surface of the ring and the mating surface 155 form the sealing surface 175 that seals the valve body 110 and prevents fluid process from escaping into the first side of the ring 200 or the second side of the ring 210 or from escaping into the environment. In some embodiments the mating surface 155 is beveled to receive the ring and improve the seal between the ring 140 and the mating surface 155. In some embodiments the mating surface 155 is a high-wear material. In some embodiments the ring comprises a plurality of seals 125 configured to further prevent fluid process from leaving the central channel of the valve.

Figure 4:
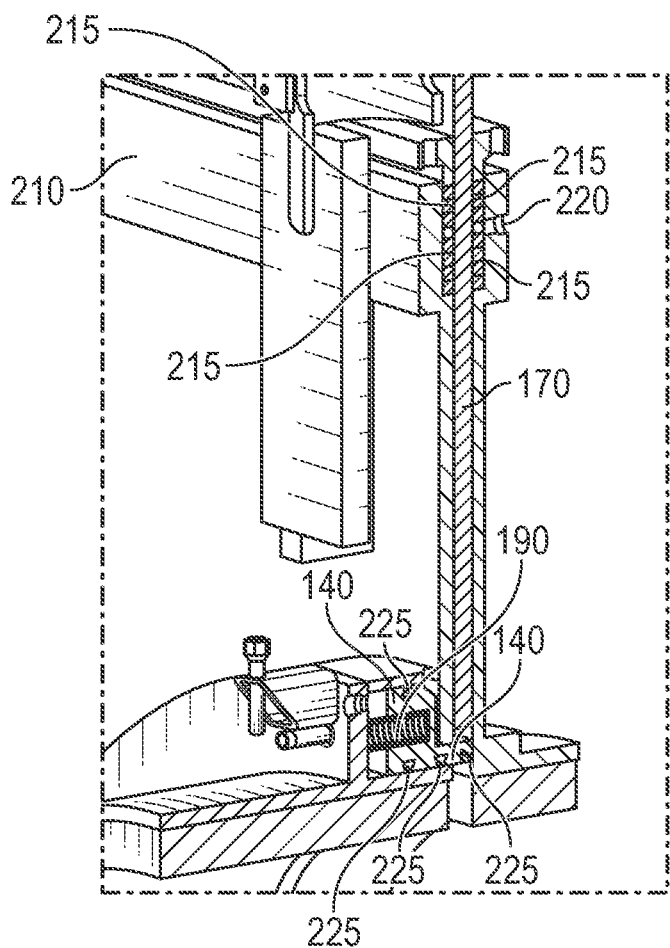
FIG. 4 illustrates a detailed cutaway view of the receiving channel, biasing mechanism and sealing mechanism.
Figure 5:
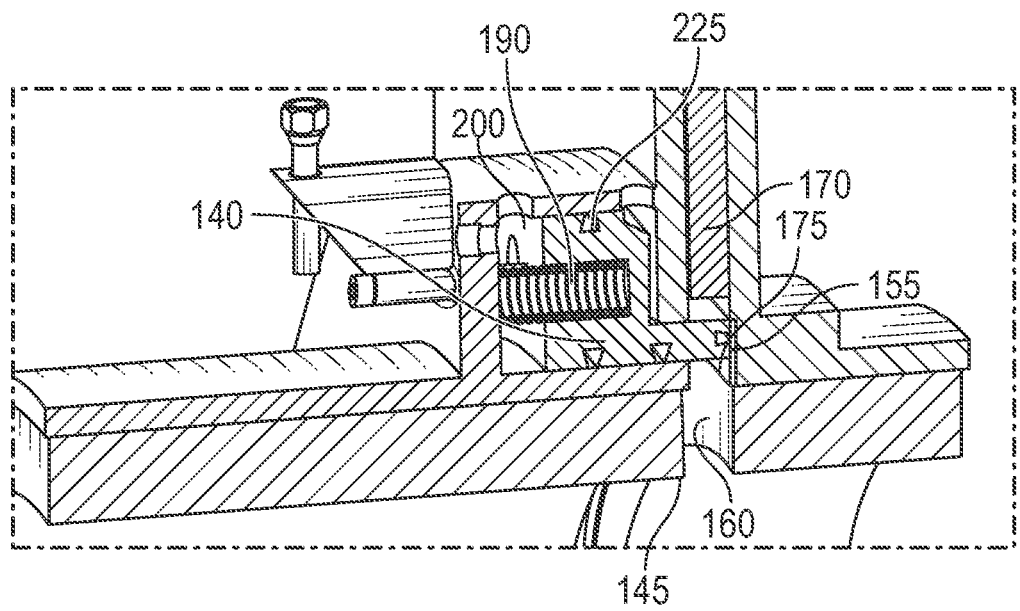
FIG. 5 illustrates a detailed cutaway view of the receiving channel, biasing mechanism and sealing mechanism.

Referring now to FIGS. 4-5, in some embodiments the present invention comprises a sealing mechanism 135 comprised of the ring 140 and the mating surface 155. The sealing mechanism 135 comprises the ring 140 with a sealing lip 142. In some embodiments the sealing lip 142 may be beveled. In some embodiments the sealing lip 142 is beveled to increase the contact between the sealing lip 142 and the mating surface 55. In some embodiments the sealing lip 142 and the mating surface 155 are configured to form a sealing surface 175.

Figure 6:
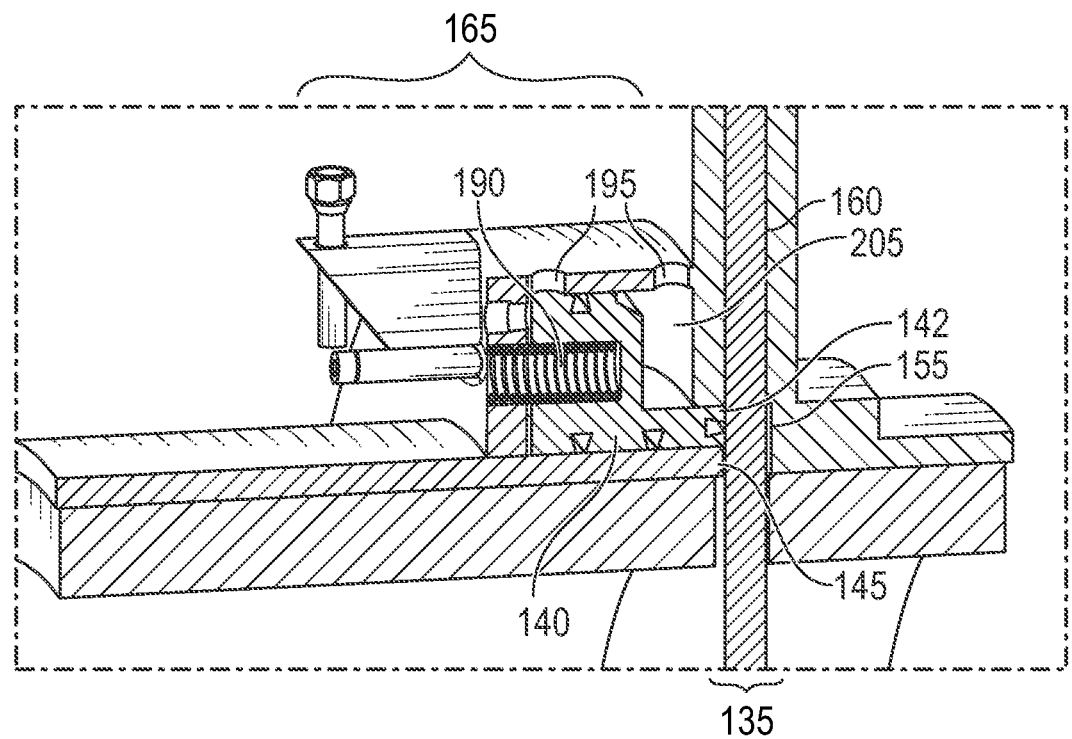
FIG. 6 illustrates a detailed cutaway view of the receiving channel, biasing mechanism and sealing mechanism.
Figure 7:
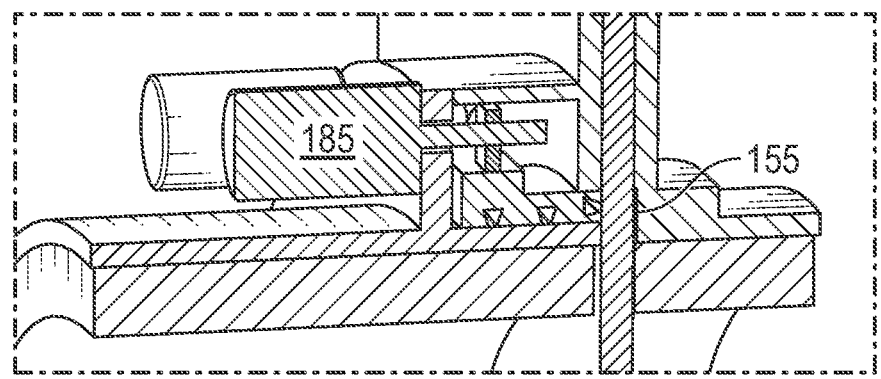
FIG. 7 illustrates a detailed cutaway view of the receiving channel, biasing mechanism and sealing mechanism.
Figure 8:
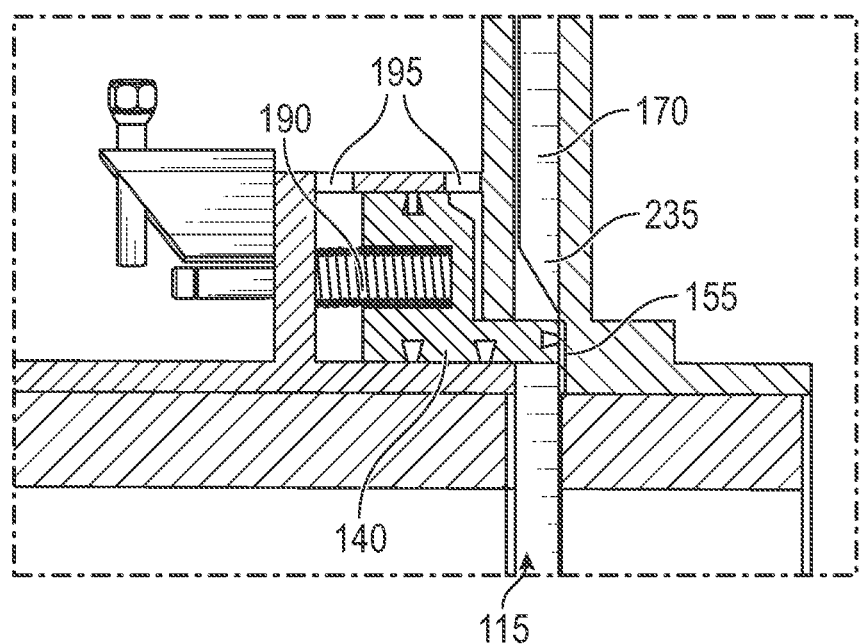
FIG. 8 illustrates a knife blade.

Referring now to FIG. 6, in some embodiments the sealing mechanism 135 comprises the ring 140 with sealing lip 142. In some embodiments the sealing lip 142 may be beveled. In some embodiments the sealing lip 142 is flat. In some embodiments the sealing lip 142 is beveled to increase the contact between the sealing lip 142 and the blind 170. In some embodiments the sealing lip 142 and the blind 170 surface are configured to form a blind sealing surface. In some embodiments the present invention is configured to forms a seal when the blind 170 is in the open position and when the blind is in the closed position (see FIG. 3). In some embodiments the sealing mechanism 135 is on the upstream side of the blind valve 105.

In some embodiments the pressure in the main channel is about 5 PSI. In some embodiments the bias mechanism 165 creates a biasing force between the ring 140 and the blind 170 or the ring and the mating surface 155 that is greater than 5 PSI. In some embodiments the bias mechanism comprises a steam input 195 wherein steam is filled on a first side 200 of the ring to compliment the direction of the spring force. In some embodiments the first side of the ring 200 is configured to maintain a pressure to allow the first side 200 to expand as the ring 140 extends along the long axis 150 to engage the ring 140 with a surface. In some embodiments the force created by the additional steam in the first side exceeds 10 PSI.

In some embodiments steam in introduced into the second side 105 of the ring. In some embodiments the second side of the ring 105 is configured to maintain enough pressure to counteract the force of the spring and expand the second camber 105 to move the ring 140 into a position to allow the blind 170 to move between the open position and the closed position or from the closed position to the open position.

The receiving channel further comprises a collar 110 extending from the outside surface of the valve body 110, the collar 110 comprising packing 115 and internal channels 120. In some embodiments the packing is a graphite packing. In some embodiments the packing 115 is configured to prevent process fluid and gasses from escaping the system. In some embodiments the packing assist the containment performed by the ring 140. In some embodiments the packing prevents the escape of gasses and process fluid which the ring is in a retracted position to allow the blind 170 to move.

In some embodiments the collar 110 comprises internal channels to vent into the receiving channel 125. In some embodiments the internal channels channel steam, nitrogen or other fluids through the collar 110 and into the receiving channel 125. In some embodiments the pressure in the channels is greater than the pressure in the main channel in the valve, thus preventing the fluid process in the main channel from moving up the receiving channel 125, or from exiting the receiving channel 125 into the atmosphere.

In some embodiments the first side 100, the second side 105 and the collar can each be purged with steam, nitrogen, a product from the refractory tower, or some other purging agent.

In some embodiments the automated line blind 105 can replace multiple valves, such as a blind valve and a butterfly valve currently used to isolate sections of a refinery.

In some embodiments the blind 170 is configured with a rounded edge. In some embodiments the valve is conjured to be self-cleaning. In some embodiments the leading edge of the blind 170 comprises an angled knife edge or chiseled edge 235 configured to clean the sealing surface 175. In some embodiments the deposits being scraped are catalyst from the fluid process. In some embodiments the scraping occurs on the down-stream side. In some embodiments, as the valve strokes, the blind 170 will remove built-up debris. In some embodiments the valve is only stroked after extended intervals that may be monthly, annually, every five years, or longer. In some embodiments the blind 170 scrapes debris from the mating surface 155. In some embodiments the valve 105 is self-cleaning. In some embodiments the gate must extend past the ring 140 to provide sufficient surface area against which to seal. In some embodiments the blind 170 comprises a full radius. In some embodiments the blind 170 is flat or square.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. An automated line blind valve comprising:
   a valve body comprising an exterior and an inside wall, the inside wall comprising an annular recess that comprises a first side and a second side divided by a receiving channel and a receiving groove;
   a sealing mechanism comprising:
      a ring disposed on the first side of the annular recess wherein the ring is configured to slide bi-directionally along a longitudinal axis of the automated line blind valve; and
      a mating surface on theft second side of the annular recess opposite the ring;
   a biasing mechanism adjacent to the annular recess wherein the biasing mechanism is configured to bidirectionally selectively actuate the ring along the longitudinal axis of the automated line blind valve to shift the ring between a sealed configuration and an unsealed configuration; and
   a blind configured to selectively actuate bi-directionally transverse to the longitudinal axis of the automated line blind valve, through the receiving channel, to shift between an open configuration and a closed configuration; wherein when the blind is in the closed configuration and the ring is in the sealed configuration, the ring forms a seal with the blind; and wherein when the blind is in the open configuration and the ring is in the sealed configuration, the ring forms a seal with the mating surface.

2. The automated line blind valve of claim 1 further comprising an actuator coupled to the exterior of the automated line blind valve and configured to selectively actuate the blind into and out of the receiving channel.

3. The automated line blind valve of claim 1, wherein the biasing mechanism further comprises a series of annularly-spaced pistons, wherein the series of annularly-spaced pistons is coupled to the ring and configured to bias the ring toward the sealed configuration.

4. The automated line blind valve of claim 1, wherein the biasing mechanism comprises a spring configured to produce a spring force to bias the ring toward the sealed configuration.

5. The automated line blind valve of claim 1, wherein the biasing mechanism comprises a first chamber disposed adjacent to a first side of the ring, wherein the first chamber is configured to be filled with steam to produce a first steam force to bias the ring toward the sealed configuration.

6. The automated line blind valve of claim 1, wherein the biasing mechanism comprises a second chamber disposed adjacent to a second side of the ring, wherein the second chamber is configured to be filled with steam to produce a second steam force to bias the ring toward the unsealed configuration.

7. The automated line blind valve of claim 1, further comprising a collar extending from the exterior of the valve body, the collar comprising packing and internal channels configured to direct a fluid around the collar and prevent a process fluid from escaping the automated line blind valve through the collar.

8. The automated line blind valve of claim 1, wherein a leading edge of the blind is beveled to a point, wherein the point scrapes the mating surface when the blind is actuated from the open configuration to the closed configuration.

9. The automated line blind valve of claim 1, wherein when the blind is in the closed configuration, a leading edge of the blind is disposed within a portion of the receiving groove positioned opposite the receiving channel, and when the blind is in the open configuration, the leading edge of the blind is disposed within the receiving channel.

10. The automated line blind valve of claim 1, wherein the valve body further comprises a rectangular portion and an annular portion, wherein the receiving channel extends through the rectangular portion, wherein a distal edge of the annular portion is disposed opposite the rectangular portion, and wherein no portion of the blind is configured to extend beyond the distal edge of the annular portion.

* * * * *